(12) United States Patent
Hosseini et al.

(10) Patent No.: US 12,101,741 B2
(45) Date of Patent: Sep. 24, 2024

(54) SIDELINK REFERENCE SIGNAL CONFIGURATION

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 17/447,666

(22) Filed: Sep. 14, 2021

(65) Prior Publication Data
US 2023/0084636 A1 Mar. 16, 2023

(51) Int. Cl.
*H04W 72/02* (2009.01)
*H04L 5/00* (2006.01)
*H04W 52/52* (2009.01)
*H04W 72/0446* (2023.01)
*H04W 72/56* (2023.01)

(52) U.S. Cl.
CPC ........... *H04W 72/02* (2013.01); *H04L 5/0051* (2013.01); *H04W 52/52* (2013.01); *H04W 72/0446* (2013.01); *H04W 72/56* (2023.01)

(58) Field of Classification Search
CPC ..... H04W 72/02; H04W 72/56; H04W 52/52; H04W 72/0446; H04L 5/0051
See application file for complete search history.

(56) References Cited

U.S. PATENT DOCUMENTS

| | | | |
|---|---|---|---|
| 2020/0022089 A1* | 1/2020 | Guo | H04W 52/242 |
| 2020/0322024 A1 | 10/2020 | Cheng et al. | |
| 2020/0359367 A1* | 11/2020 | Tang | G01S 5/0236 |
| 2021/0091836 A1 | 3/2021 | Taherzadeh Boroujeni et al. | |
| 2021/0212050 A1* | 7/2021 | Lu | H04L 5/0005 |
| 2021/0337514 A1* | 10/2021 | Xiang | H04W 72/02 |
| 2021/0400665 A1* | 12/2021 | Zhao | H04W 72/0446 |
| 2022/0007227 A1 | 1/2022 | Zhao et al. | |
| 2022/0190983 A1* | 6/2022 | Zhao | H04W 16/00 |

FOREIGN PATENT DOCUMENTS

WO 2020191763 A1 10/2020

OTHER PUBLICATIONS

International Search Report and Written Opinion—PCT/US2022/075205—ISA/EPO—Oct. 17, 2022.

* cited by examiner

*Primary Examiner* — Brian P Cox
(74) *Attorney, Agent, or Firm* — Harrity & Harrity, LLP

(57) ABSTRACT

Various aspects of the present disclosure generally relate to wireless communication. In some aspects, a first user equipment (UE) may receive an indication of a configuration for transmitting a sidelink reference signal (SL-RS) that is to be transmitted independently of data transmission and that has a frequency bandwidth that is independent of a frequency bandwidth configured for transmission on a physical sidelink shared channel. The UE may transmit the SL-RS to a second UE according to the configuration. Numerous other aspects are described.

30 Claims, 10 Drawing Sheets

SIDELINK REFERENCE SIGNAL CONFIGURATION

FIELD OF THE DISCLOSURE

Aspects of the present disclosure generally relate to wireless communication and to techniques and apparatuses for a sidelink reference signal configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include receiving an indication of a configuration for transmitting a sidelink reference signal (SL-RS) that is to be transmitted independently of data transmission and that has a frequency bandwidth that is independent of a frequency bandwidth configured for transmission on a physical sidelink shared channel (PSSCH). The method may include transmitting the SL-RS to a second UE according to the configuration.

Some aspects described herein relate to a method of wireless communication performed by a second UE. The method may include generating a configuration for transmitting an SL-RS that is to be transmitted independently of data transmission and that has a frequency bandwidth that is independent of a frequency bandwidth configured for transmission on a PSSCH. The method may include transmitting an indication of the configuration to a first UE.

Some aspects described herein relate to a first UE for wireless communication. The first UE may include memory, one or more processors coupled to the memory, and instructions stored in the memory and executable by the one or more processors. The instructions may be executable by the one or more processors to cause the first UE to receive an indication of a configuration for transmitting an SL-RS that is to be transmitted independently of data transmission and that has a frequency bandwidth that is independent of a frequency bandwidth configured for transmission on a PSSCH. The instructions may be executable by the one or more processors to cause the first UE to transmit the SL-RS to a second UE according to the configuration.

Some aspects described herein relate to a second UE for wireless communication. The second UE may include memory, one or more processors coupled to the memory, and instructions stored in the memory and executable by the one or more processors. The instructions may be executable by the one or more processors to cause the second UE to generate a configuration for transmitting an SL-RS that is to be transmitted independently of data transmission and that has a frequency bandwidth that is independent of a frequency bandwidth configured for transmission on a PSSCH. The instructions may be executable by the one or more processors to cause the second UE to transmit an indication of the configuration to a first UE.

Some aspects described herein relate to a non-transitory computer-readable medium that stores one or more instructions for wireless communication by a first UE. The one or more instructions, when executed by one or more processors of the UE, may cause the UE to receive an indication of a configuration for transmitting an SL-RS that is to be transmitted independently of data transmission and that has a frequency bandwidth that is independent of a frequency bandwidth configured for transmission on a PSSCH. The one or more instructions, when executed by one or more processors of the UE, may cause the UE to transmit the SL-RS to a second UE according to the configuration.

Some aspects described herein relate to a non-transitory computer-readable medium that stores one or more instructions for wireless communication by a second UE. The one or more instructions, when executed by one or more processors of the UE, may cause the UE to generate a configuration for transmitting an SL-RS that is to be transmitted independently of data transmission and that has a frequency bandwidth that is independent of a frequency bandwidth configured for transmission on a PSSCH. The one or more instructions, when executed by one or more processors of the UE, may cause the UE to transmit an indication of the configuration to a first UE.

Some aspects described herein relate to an apparatus for wireless communication. The apparatus may include means for receiving an indication of a configuration for transmitting an SL-RS that is to be transmitted independently of data transmission and that has a frequency bandwidth that is independent of a frequency bandwidth configured for transmission on a PSSCH. The apparatus may include means for transmitting the SL-RS to another apparatus according to the configuration.

Some aspects described herein relate to an apparatus for wireless communication. The apparatus may include means for generating a configuration for transmitting an SL-RS that is to be transmitted independently of data transmission and that has a frequency bandwidth that is independent of a frequency bandwidth configured for transmission on a PSSCH. The apparatus may include means for transmitting an indication of the configuration to another apparatus.

Aspects generally include a method, apparatus, system, computer program product, non-transitory computer-readable medium, user equipment, base station, wireless communication device, and/or processing system as substantially described herein with reference to and as illustrated by the drawing and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
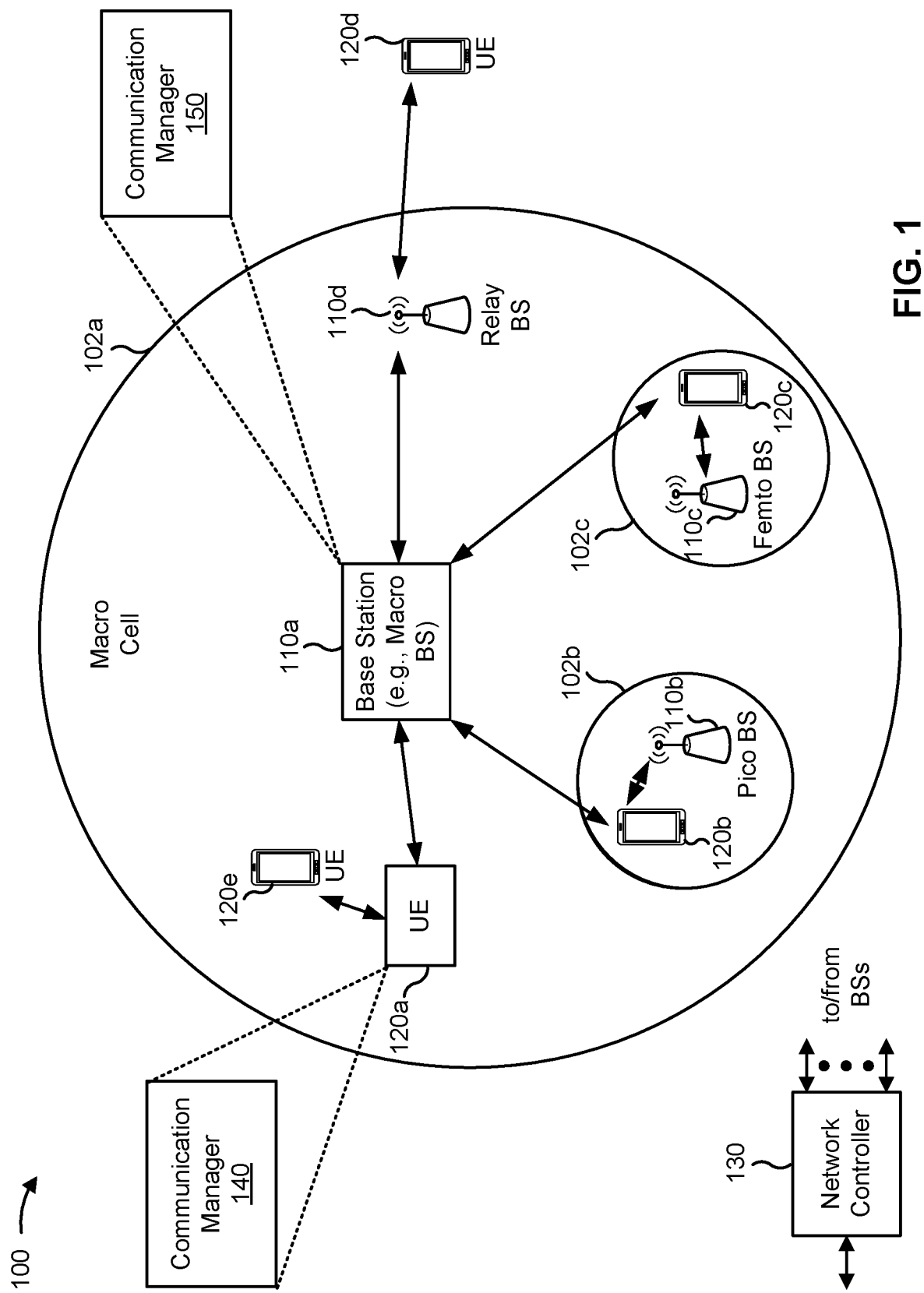
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a configuration for transmitting a sidelink reference signal (SL-RS) that is to be transmitted independently of data transmission and that has a frequency bandwidth that is independent of a frequency bandwidth configured for transmission on a physical sidelink shared channel (PSSCH). The communication manager 140 may transmit the SL-RS to a second UE according to the configuration. Additionally, or alternatively, the communication manager 140 may perform one or more other operations described herein.

In some aspects, the UE 120 may include a communication manager 140. As described in more detail elsewhere herein, the communication manager 140 may generate a configuration for transmitting an SL-RS that is to be transmitted independently of data transmission and that has a frequency bandwidth that is independent of a frequency bandwidth configured for transmission on a PSSCH. The communication manager may transmit an indication of the configuration to a first UE. Additionally, or alternatively, the communication manager 140 may perform one or more other operations described herein. In some aspects, the base station 110 may include a communication manager 150, and the communication manager 150 may generate and transmit the configuration.

As indicated above, FIG. 1 is provided as an example. Other examples may differ from what is described with regard to FIG. 1.

Figure 2:
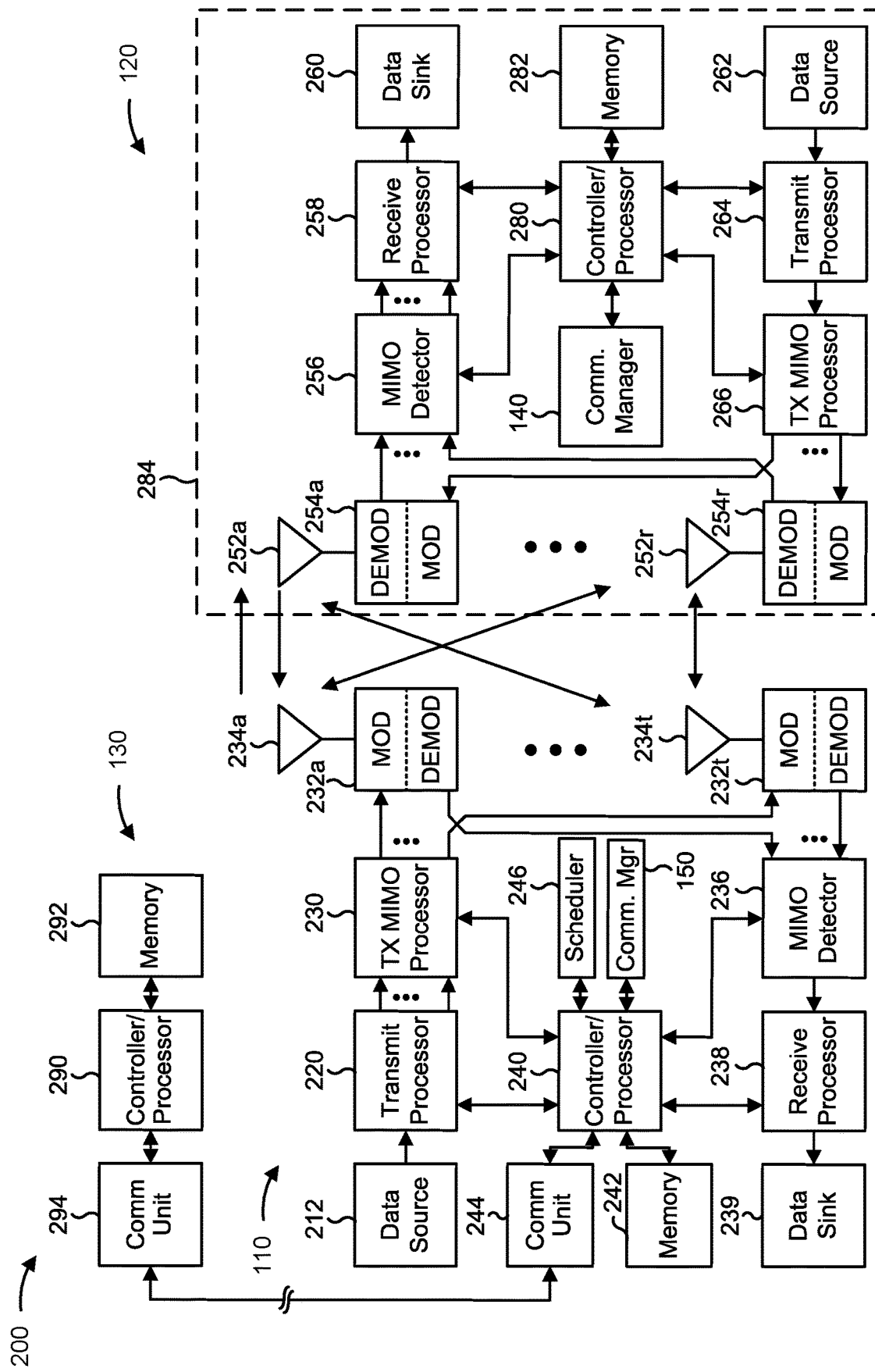
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with configuring an enhanced SL-RS, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a first UE (e.g., UE 120) includes means for receiving an indication of a configuration for transmitting an SL-RS that is to be transmitted independently of data transmission and that has a frequency bandwidth that is independent of a frequency bandwidth configured for transmission on a PSSCH; and/or means for transmitting the SL-RS to a second UE according to the configuration. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second UE (e.g., UE 120) includes means for generating a configuration for transmitting an SL-RS that is to be transmitted independently of data transmission and that has a frequency bandwidth that is independent of a frequency bandwidth configured for transmission on a PSSCH; and/or means for transmitting an indication of the configuration to a first UE. The means for the second UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for generating a configuration for transmitting an SL-RS that is to be transmitted independently of data transmission and that has a frequency bandwidth that is independent of a frequency bandwidth configured for transmission on a PSSCH; and/or means for transmitting an indication of the configuration to the first UE. The means for the base station 110 to perform operations described herein may include, for example, one or more of communication manager 150, antenna 234, modem 232, MIMO detector 236, receive processor 238, transmit processor 220, TX MIMO processor 230, controller/processor 240, or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
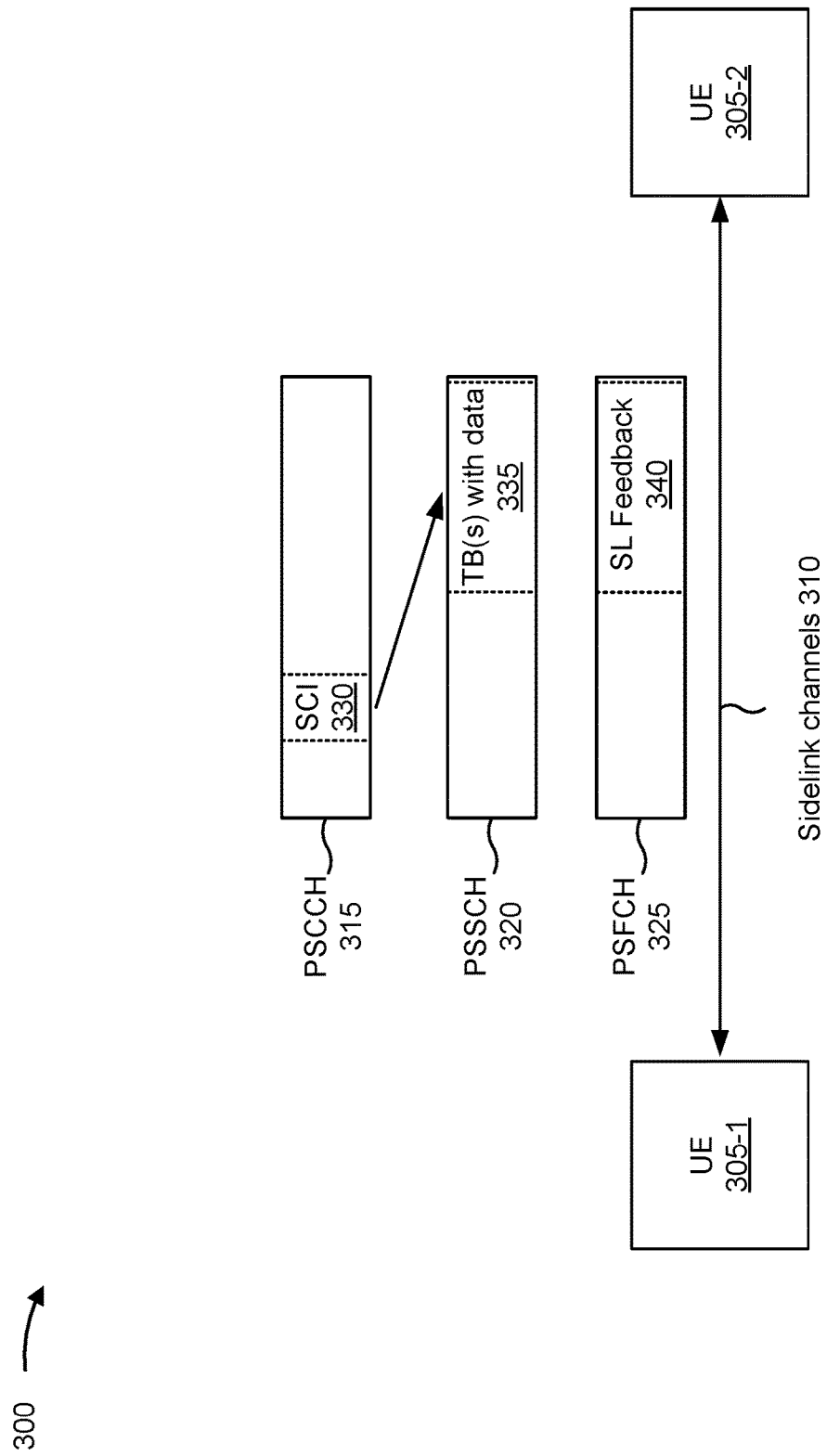
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. UEs 305-1 and 305-2 may communicate using the one or more sidelink channels 310 for P2P communications, D2D communications, V2X communications (e.g., which may include V2V communications, V2I communications, V2P communications), and/or mesh networking. In some aspects, UEs 305 (e.g., UE 305-1 and/or UE 305-2) may correspond to one or more other UEs described elsewhere herein, such as UE 120. In some aspects, one or more sidelink channels 310 may use a PC5 interface and/or may operate in a high frequency band (e.g., the 5.9 GHz band). Additionally, or alternatively, the UEs 305 may synchronize timing of transmission time intervals (e.g., frames, subframes, slots, symbols, and/or the like) using global navigation satellite system timing.

As further shown in FIG. 3, one or more sidelink channels 310 may include a physical sidelink control channel (PSCCH) 315, a PSSCH 320, and/or a physical sidelink feedback channel (PSFCH) 325. PSCCH 315 may be used to communicate control information, similar to a physical downlink control channel (PDCCH) and/or a physical uplink control channel (PUCCH) used for cellular communications with a base station 110 via an access link or an access channel. PSSCH 320 may be used to communicate data, similar to a physical downlink shared channel (PDSCH) and/or a physical uplink shared channel (PUSCH) used for cellular communications with base station 110 via an access link or an access channel. For example, PSCCH 315 may carry sidelink control information (SCI) 330, which may indicate various control information used for sidelink communications, such as one or more resources (e.g., time resources, frequency resources, spatial resources) where a transport block (TB) 335 may be carried on PSSCH 320. TB 335 may include data. PSFCH 325 may be used to communicate sidelink feedback 340, such as hybrid automatic repeat request (HARD) feedback (e.g., acknowledgement or negative acknowledgement (ACK/NACK) information), transmit power control, a scheduling request, and/or the like.

In some aspects, one or more sidelink channels 310 may use resource pools. For example, a scheduling assignment (e.g., included in SCI 330) may be transmitted in sub-channels using specific resource blocks (RBs) across time. In some aspects, data transmissions (e.g., on PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by UE 305 (e.g., rather than a base station 110). In some aspects, UE 305 may perform resource selection and/or scheduling by sensing channel availability for transmissions. For example, UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels and may select a channel for transmission of a sidelink communication based at least in part on the measurement(s).

Additionally, or alternatively, UE 305 may perform resource selection and/or scheduling using SCI 330 received in PSCCH 315, which may indicate occupied resources, and/or channel parameters. Additionally, or alternatively, UE 305 may perform resource selection and/or scheduling by determining a channel busy rate associated with various sidelink channels, which may be used for rate control (e.g., by indicating a maximum number of resource blocks that UE 305 can use for a particular set of subframes).

In the transmission mode where resource selection and/or scheduling is performed by a UE 305, UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on PSSCH 320 (e.g., for TBs 335), one or more subframes to be used for the upcoming sidelink transmission, a modulation and coding scheme to be used for the upcoming sidelink transmission, and/or the like. In some aspects, a UE 305 may generate a sidelink grant that indicates one or more parameters for semi-persistent scheduling, such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
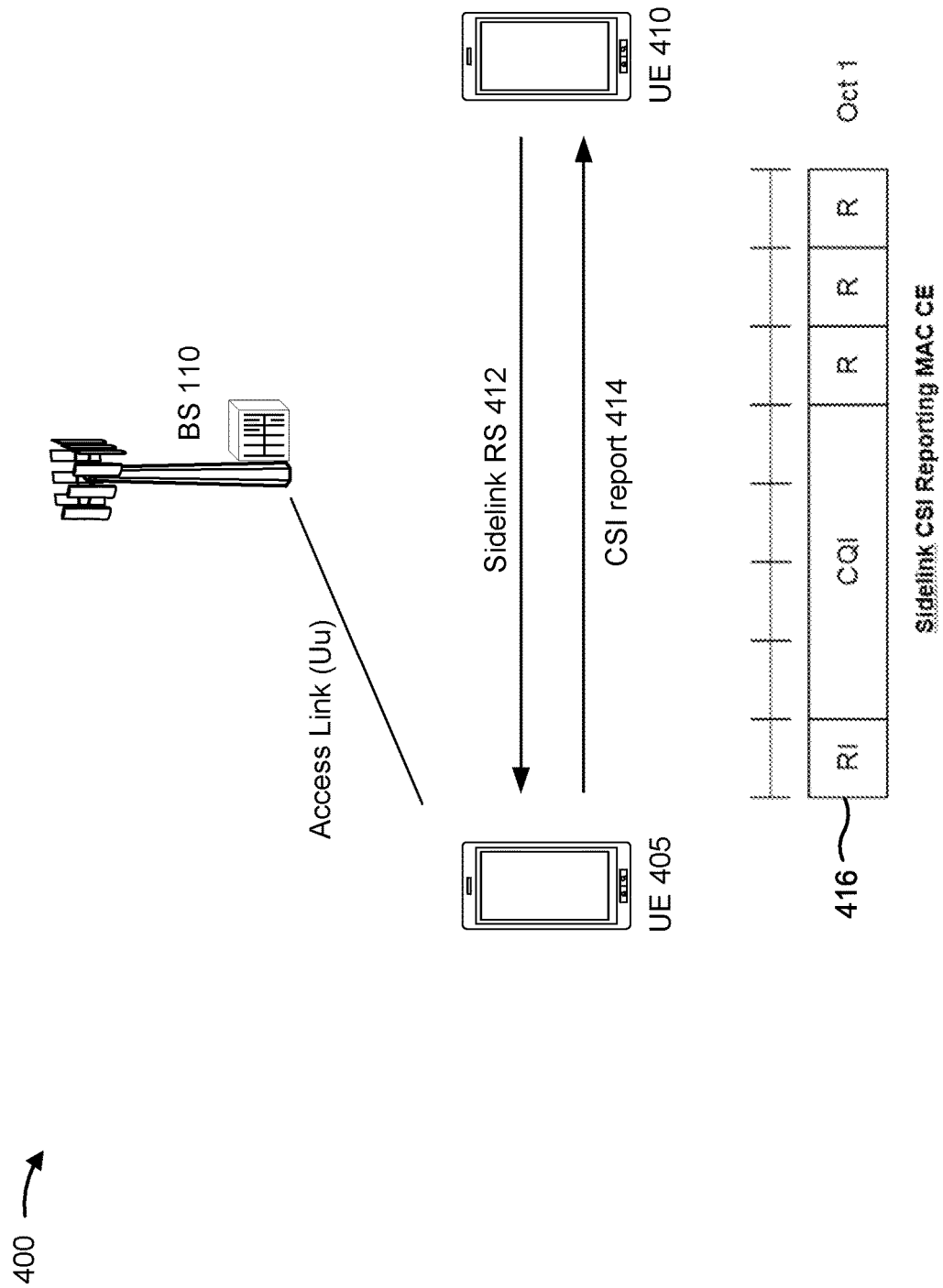
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a UE 405 and another UE 410 may communicate with one another via a sidelink, as described above in connection with FIG. 3. As further shown, in some sidelink modes, a base station 110 may communicate with UE 405 via a first access link. Additionally, or alternatively, in some sidelink modes, base station 110 may communicate with UE 410 via a second access link. UE 405 and/or UE 410 may correspond to one or more UEs described elsewhere herein, such as UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted on a PC5 via the sidelink, and access link communications may be transmitted via the access link. An access link communication may be either a downlink communication (from a base station 110 to a UE 120) or an uplink communication (from a UE 120 to a base station 110) on a Uu interface.

Communication between 405 and 410, with base station 110 allocating resources for sidelink transmissions, may be referred to as Mode 1 sidelink communication. In Mode 1, UE 405 may be a relay UE for UE 410 (remote UE). In sidelink Mode 1, base station 110 may schedule a sidelink resource upon receiving a sidelink buffer status report (SL-BSR) from UE 405. Base station 110 may then transmit a sidelink grant via downlink control information (DCI) to UE 405. Communication between UE 405 and UE 410, without involving BS 110, may be referred to as Mode 2 sidelink communication.

UE 410 may transmit an SL-RS 412 to UE 405. The SL-RS may be a channel state information (CSI) reference signal (CSI-RS). The sidelink CSI-RS may carry information for sidelink channel estimation, which may be used for scheduling, link adaptation, or beam management, among other examples. UE 410 may transmit the sidelink CSI-RS within a unicast PSSCH transmission. Higher layer signaling may set parameters that indicate the quantity of ports for the sidelink CSI-RS (nrofPortsCSIRS-SL), the first OFDM symbol in a physical resource block to use for the sidelink CSI-RS (firstSymbolInTimeDomainCSIRS-SL), and/or the frequency domain allocation for the sidelink CSI-RS (frequDomainAllocationCSIRS-SL). UE 405 may configure a set of sidelink CSI-RSs for UE 410. The base station 110 may also configure a set of sidelink CSI-RSs for UE 410.

UE 405 may measure sidelink CSI-RSs that are transmitted by UE 410. Based at least in part on the measurements, UE 405 may perform channel estimation and may report channel estimation parameters (e.g., in a CSI report 414) to UE 410 or to the base station 110. The CSI report 414 may be a medium access control control element (MAC CE) 416 that includes a channel quality indicator (CQI) and rank indicator (RI). UE 405 may calculate the CQI based on the reported RI. UE 405 may report a wideband CQI for the CSI reporting frequency band, which is limited to the PSSCH transmission band. The CSI report 414 may also include a precoding matrix indicator (PMI), a CSI-RS resource indicator (CRI), a layer indicator (LI), or an RSRP value, among other examples. UE 410 may use the CSI report 414 to select transmission parameters for sidelink communications to the UE 120, such as a number of transmission layers (e.g., a rank), a precoding matrix (e.g., a precoder), an MCS, or a refined beam (e.g., using a beam refinement procedure or a beam management procedure), among other examples.

CSI reporting may be enabled by a higher layer parameter (sl-CSI-Acquisition) and by a CSI request field in SCI format 0-2 being set to 1 (one). UE 405 may provide the CSI report 414 periodically or aperiodically (e.g., triggered by SCI). If the CSI report 414 is provided aperiodically, UE 410 may not trigger another aperiodic CSI report before the last slot of the ongoing aperiodic CSI report. CSI reporting may be controlled by radio resource control (RRC) signaling (e.g., sl-LatencyBound-CSI-Report maintained for each PC5-RRC connection). CSI reporting may be cancelled, or triggered by a scheduling request (sidelink Mode 1), if a latency requirement in sl-LatencyBound-CSI-Report will not be met.

While a sidelink CSI-RS may help UE 405 and UE 410 to improve communications, the sidelink CSI-RS that is currently used has drawbacks. Transmission of the sidelink CSI-RS depends on data availability, because the sidelink CSI-RS is multiplexed with data on the PSSCH. Accordingly, the bandwidth of the sidelink CSI-RS is limited to the bandwidth of the PSSCH. These limits on the transmission and bandwidth of the sidelink CSI-RS limit the effectiveness of the sidelink CSI-RS. Ineffective sidelink CSI-RSs may lead to degraded communications that cause UE 405 and UE 410 to consume additional processing resources and signaling resources.

As indicated above, FIG. 4 is provided as an example. Other examples may differ from what is described with regard to FIG. 4.

Figure 5:
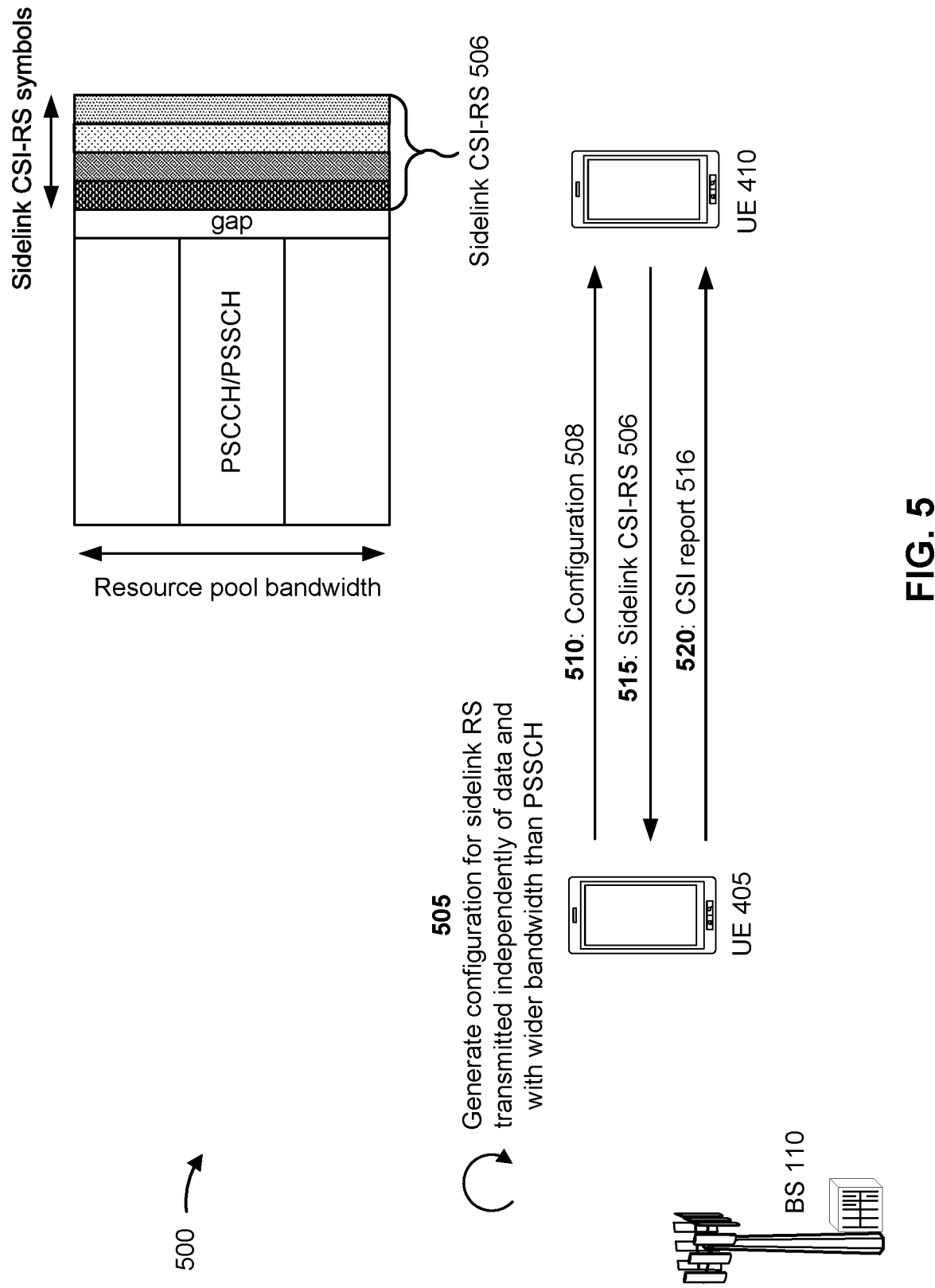
FIG. 5 is a diagram illustrating an example of configuring a sidelink reference signal, in accordance with the present disclosure.

FIG. 5 is a diagram illustrating an example 500 of configuring an SL-RS, in accordance with the present disclosure. Example 500 shows that UE 405 and UE 410 may communicate with one another. UE 405 may also communicate with the base station 110.

According to various aspects described herein, UE 405 may configure UE 410 to use an enhanced SL-RS, such as an enhanced sidelink CSI-RS, an enhanced sidelink positioning reference signal (PRS), or an enhanced sounding reference signal (SRS). The enhanced SL-RS may be a standalone SL-RS that is transmitted independently of data transmission (e.g., not multiplexed with data, transmitted in a sidelink slot regardless of whether the sidelink slot has data on the PSSCH). The enhanced SL-RS may improve resource efficiency for both sidelink Mode 1 and sidelink Mode 2. This may cause UE 405 and UE 410 to conserve processing resources and signaling resources. The enhanced SL-RS may also improve reliability and latency for ultra-reliable low-latency communication (URLLC) scenarios. The enhanced SL-RS may have a bandwidth that is independent of a bandwidth of the PSSCH and may be wider than the bandwidth of the PSSCH. The use of wideband SL-RSs may support periodic RSs for channel estimation when UEs are not as mobile, such as for consumer wearables or for extended reality. In some aspects, UE 405 and/or UE 410 may prioritize transmission of data and/or SL-RSs to account for phase continuity issues that may arise from wideband SL-RSs.

Example 500 shows an example of configuring and using an enhanced SL-RS. As shown by reference number 505, UE 405 may generate a configuration 508 for an SL-RS that is to be transmitted independently of data and with a frequency bandwidth that is independent of a frequency bandwidth used for transmission on the PSSCH. For example, the enhanced SL-RS may be a sidelink CSI-RS 506, as shown in example 500. The CSI-RS 506 may include one or more symbols at an end of a sidelink slot. Because the PSCCH/PSSCH and the CSI-RS 506 may be time division multiplexed, the CSI-RS 506 may be independent of (e.g., not multiplexed or included with data in) the PSSCH and may have a frequency bandwidth that is independent of a frequency bandwidth used for transmission on the PSSCH. This may enable the CSI-RS to have a wider frequency bandwidth than the PSSCH. There may be a gap symbol before and/or after the symbols of the sidelink CSI-RS 506 in the sidelink slot.

In some aspects, the configuration 508 may specify that the enhanced SL-RS may be transmitted in one or more specified resource elements (REs) of a sidelink slot. The REs may be specific time and frequency resources set aside for the enhanced SL-RS, such as REs not used for data. One or more of the REs may be in RBs or frequency resources that are different than the RBs used for the PSCCH and/or the PSSCH.

In some aspects, the configuration 508 may specify that the enhanced SL-RS may be transmitted in a sidelink slot that is fully allocated to an SL-RS. For example, the sidelink slot may not include data or other control signals, but may include only one or more SL-RSs.

In some aspects, there may be some resources, whether RBs, REs, or slots, that are identified as unavailable for sidelink communications. The unavailable resources may be specific to a given resource pool or may be identified as part of a resource pool configuration. The configuration 508 may specify that resources allocated for SL-RSs are not included in a resource pool configuration or that SL-RSs included in a resource pool configuration are not available for data transmission or, more generally, for transmission on a physical sidelink channel (e.g., PSCCH, PSSCH, PFSCH). In this way, the configuration 508 may specify resources that are limited to a sidelink bandwidth part (BWP) but not restricted to any of the resource pools provided to a UE.

As shown by reference number 510, UE 405 may transmit the configuration 508 to UE 410. UE 410 may configure an enhanced SL-RS, such as the sidelink CSI-RS 506. As shown by reference number 515, UE 410 may transmit the sidelink CSI-RS 506. UE 410 may transmit the sidelink CSI-RS 506 in the same sidelink slot as data in the PSSCH but independent of the data in the PSSCH. UE 405 may measure the sidelink CSI-RS 506 and generate a CSI report 516. The CSI report 516 may be based at least in part on a wider bandwidth than the PSSCH. As shown by reference number 520, UE 405 may transmit the CSI report 516. In some aspects, UE 410 may transmit the sidelink CSI-RS 506 in a sidelink slot without any data in the PSSCH and without waiting for such data. In other words, UE 410 may transmit the sidelink CSI-RS 506 in a more efficient manner than current sidelink CSI-RSs and receive a more accurate CSI report 516 that current CSI reports.

As indicated above, FIG. 5 is provided as an example. Other examples may differ from what is described with regard to FIG. 5.

Figure 6:
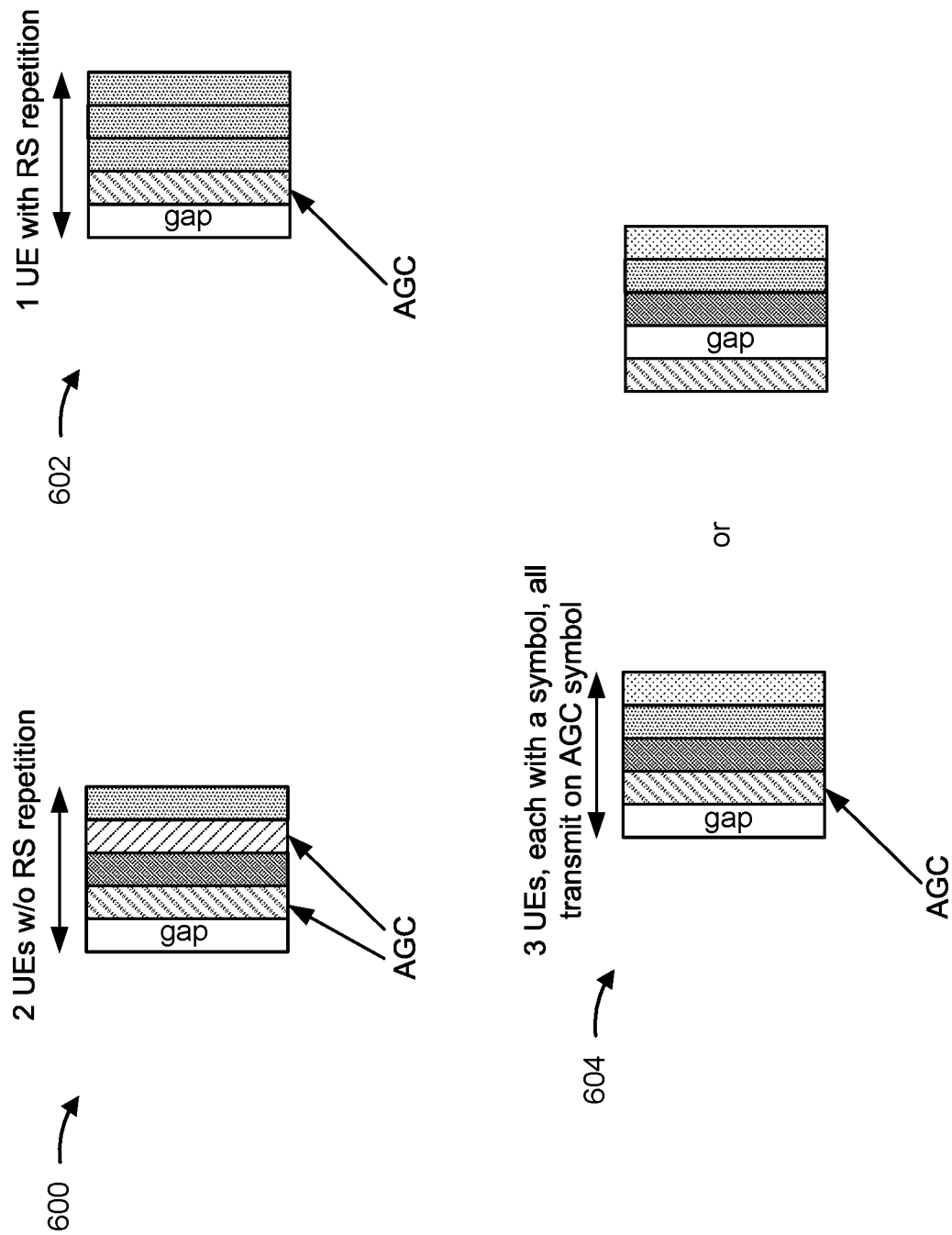
FIG. 6 is a diagram illustrating examples of sidelink reference signal configurations, in accordance with the present disclosure.

FIG. 6 is a diagram illustrating examples 600, 602, and 604 of SL-RS configurations, in accordance with the present disclosure.

In some aspects, UE 405 may specify multiple SL-RS configurations. Such configurations may have different reference signal bandwidths, different quantities and locations of symbols for the SL-RS, different quantities and locations for symbols used as gap symbols, and different quantities and locations of symbols used for AGC. UE 405 may also specify a hopping pattern, a comb factor, or a repetition factor for an SL-RS configuration, and each SL-RS configuration may be associated with a use case (e.g., channel estimation, positioning). For example, examples 600, 602, and 604 each show a gap symbol and four symbols that are available for SL-RSs. Example 600 shows two AGC symbols and two symbols that can be used for SL-RSs by two UEs. Example 602 shows one AGC symbol and three symbols that can be used for SL-RS repetition by one UE. No other UEs could reserve these symbols. Example 604 shows one AGC symbol and three symbols that may be used for SL-RSs by three UEs. There may be a gap before the AGC symbol or between the AGC symbol and the symbols used for SL-RSs. For example, a third UE may transmit on the AGC symbol and then transmit an SL-RS on the last symbol available for SL-RSs. The multiple UEs transmitting SL-RSs on different symbols may share the same AGC symbol.

Each configuration may be associated with an index. UE 410 may transmit an indication of the index to UE 405, to inform UE 405 about the structure of the configuration and to help UE 405 with RS resource reservation. UE 410 may have information about the indices of different RS resources via configuration by the network or by pre-configuration. UE 405 may identify the configuration structure based at least in part on the index. UE 405 may receive the configuration or an indication of the configuration from UE 410 via SCI1, SCI2, or a MAC CE. UE 410 may also use a sequence-based signal that is similar to PSFCH, with a mapping between the SL-RS configurations and new channels carrying a sequence.

Phase continuity involves maintaining a same phase or similar phase across symbols. Without phase continuity, the UE may have to rearrange the antenna array between symbols. UE 405 may not multiplex a wideband standalone SL-RS with data on the same symbols, and in general, the bandwidth of the PSSCH and the bandwidth of the SL-RS may be different, and thus phase continuity may not be maintained across different symbols. Therefore, UE 405 may not transmit the PSSCH and the SL-RS simultaneously, unless the PSSCH and the SL-RS cover the same bandwidth. With regard to an SL-RS configuration such as sidelink CSI-RS 506 shown in example 500, there is no phase continuity issue on the same carrier when SL-RSs are at the end of the sidelink slot after the data. There may be a phase continuity issue if the Uu link to the base station 110 and the sidelink between UE 405 and UE 410 are on the same frequency band or if sidelink carrier aggregation (CA) is involved. For a configuration where REs are specified for an SL-RS in particular sidelink slots, there may be a phase continuity issue on the same carrier where the Uu link and the sidelink are on the same frequency band or if sidelink CA is involved. For a configuration where slots are fully allocated to SL-RSs, there may be no phase continuity issues on the same carrier.

In scenarios where there is a phase continuity issue for SL-RSs, UE 405 and/or UE 410 may prioritize communications on the PSCCH/PSSCH/PSFCH with respect to SL-RSs on the same or different carriers. For example, if transmission of the SL-RS is to overlap at least in a time domain with transmission of other SL or uplink transmissions, UE 410 may prioritize transmission of the SL-RS based at least in part on one or more of a priority of the SL-RS relative to a priority of the other SL or uplink transmissions. UE 410 may prioritize communications on the PSCCH/PSSCH/PSFCH over SL-RSs. UE 410 may drop transmission of the SL-RS. UE 410 may also prioritize communications based at least in part on a priority of the communications on the PSCCH/PSSCH/PSFCH. UE 410 may prioritize communications (and drop the other communication or signal) based at least in part on other factors, such as a component carrier index, content of the CSI report, and/or a target block error rate (BLER). UE 410 may also prioritize periodic/aperiodic data with respect to periodic/aperiodic SL-RSs and/or prioritize a triggering entity for data with respect to SL-RSs. UE 410 may prioritize communications and/or SL-RSs based at least in part on a cast type of communications on the PSSCH or associated PSFCH. Alternatively, or additionally, UE 405 or UE 410 may assign a priority level to SL-RSs that is based at least in part on one or more factors, such as the content of the CSI report, a periodicity of SL-RSs, and/or a target BLER. By prioritizing communications with respect to SL-RSs, UE 405 and UE 410 may account for phase continuity issues.

As indicated above, FIG. 6 is provided as an example. Other examples may differ from what is described with regard to FIG. 6.

Figure 7:
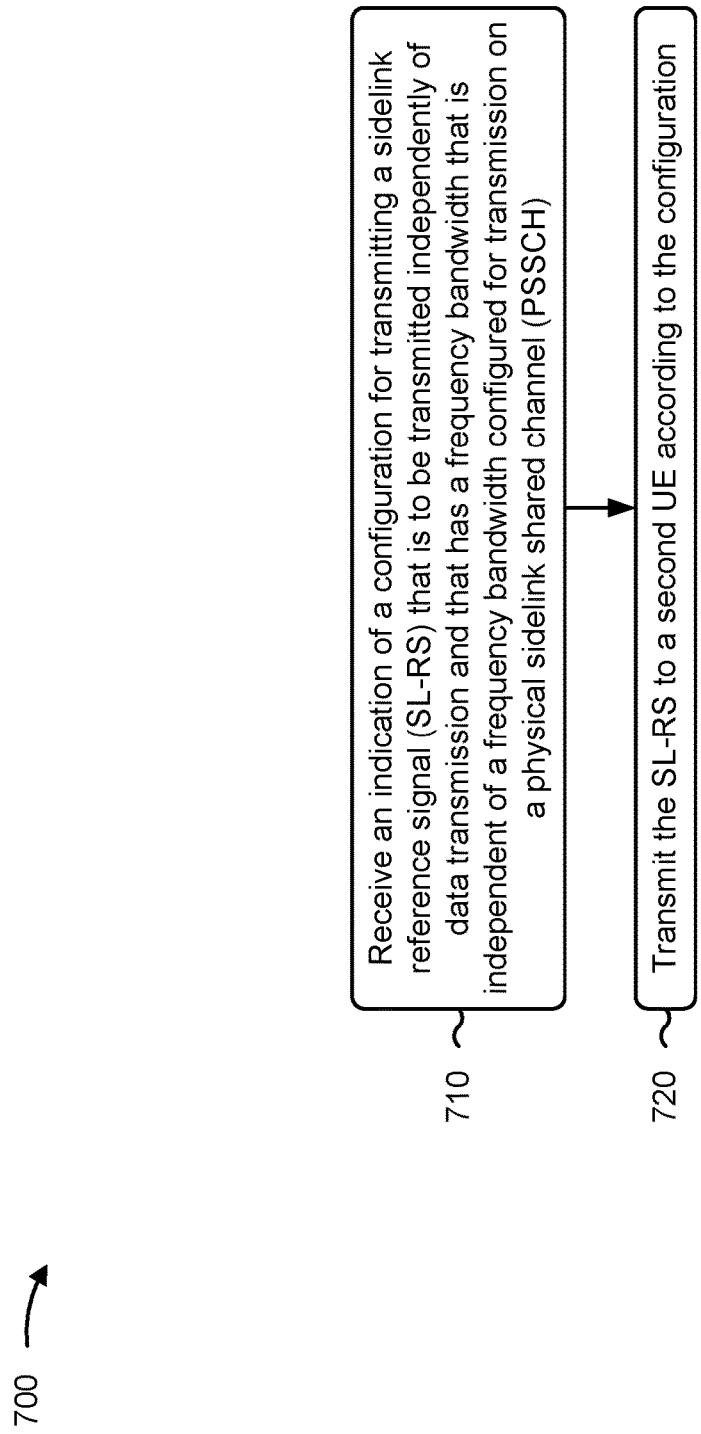
FIG. 7 is a diagram illustrating an example process performed, for example, by a first UE, in accordance with the present disclosure.

FIG. 7 is a diagram illustrating an example process 700 performed, for example, by a first UE, in accordance with the present disclosure. Example process 700 is an example where the UE (e.g., UE 120, UE 410) performs operations associated with transmitting SL-RSs.

As shown in FIG. 7, in some aspects, process 700 may include receiving an indication of a configuration for transmitting an SL-RS that is to be transmitted independently of data transmission and that has a frequency bandwidth that is independent of a frequency bandwidth configured for transmission on a PSSCH (block 710). For example, the UE (e.g., using communication manager 140 and/or reception component 902 depicted in FIG. 9) may receive an indication of a configuration for transmitting an SL-RS that is to be transmitted independently of data transmission and that has a frequency bandwidth that is independent of a frequency bandwidth configured for transmission on a PSSCH, as described above.

As further shown in FIG. 7, in some aspects, process 700 may include transmitting the SL-RS to a second UE according to the configuration (block 720). For example, the UE (e.g., using communication manager 140 and/or transmission component 904 depicted in FIG. 9) may transmit the SL-RS to a second UE according to the configuration, as described above.

Process 700 may include additional aspects, such as any single aspect or any combination of aspects described below and/or in connection with one or more other processes described elsewhere herein.

In a first aspect, the configuration specifies that the SL-RS is to be transmitted in one or more symbols of a sidelink slot after a PSSCH or a PSCCH in the sidelink slot.

In a second aspect, alone or in combination with the first aspect, the configuration specifies that the SL-RS is to be transmitted in one or more specified REs of a sidelink slot.

In a third aspect, alone or in combination with one or more of the first and second aspects, the configuration specifies that the SL-RS is to be transmitted in a sidelink slot that is allocated for the SL-RS.

In a fourth aspect, alone or in combination with one or more of the first through third aspects, wherein the configuration specifies that resources allocated for SL-RSs are not included in a resource pool configuration. Alternatively, the resources may be included in a resource pool configuration but are not available for data transmission or for transmission on a physical sidelink channel (e.g., PSCCH, PSSCH, PSFCH).

In a fifth aspect, alone or in combination with one or more of the first through fourth aspects, the receiving the indication of the configuration includes receiving the indication of the configuration as part of a resource pool configuration.

In a sixth aspect, alone or in combination with one or more of the first through fifth aspects, the configuration specifies a bandwidth for the SL-RS.

In a seventh aspect, alone or in combination with one or more of the first through sixth aspects, the configuration specifies one or more of a quantity of one or more symbols for the SL-RS in a sidelink slot, a location of the one or more symbols for the SL-RS in the sidelink slot, a quantity of one or more gap symbols in the sidelink slot, a location of the one or more gap symbols in the sidelink slot, a quantity of one or more AGC symbols in the sidelink slot, or a location of the one or more AGC symbols in the sidelink slot.

In an eighth aspect, alone or in combination with one or more of the first through seventh aspects, the configuration specifies one or more of a comb pattern for one or more symbols for the SL-RS in a sidelink slot, a hopping pattern for the one or more symbols for the SL-RS in the sidelink slot, or a repetition factor for a symbol for the SL-RS in the sidelink slot.

In a ninth aspect, alone or in combination with one or more of the first through eighth aspects, process 700 includes transmitting an index, via SCI or a MAC CE, that corresponds to the configuration.

In a tenth aspect, alone or in combination with one or more of the first through ninth aspects, the transmitting the SL-RS includes, if transmission of the SL-RS is to overlap at least in a time domain with transmission of other SL or uplink transmissions, prioritizing transmission of the SL-RS based at least in part on one or more of a priority of the SL-RS relative to a priority of the other SL or uplink transmissions, a component carrier index, a content of a report for the SL-RS, a periodicity of the SL-RS, a block error rate target for the SL-RS, a triggering entity, or a cast type of the other SL or uplink resources.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
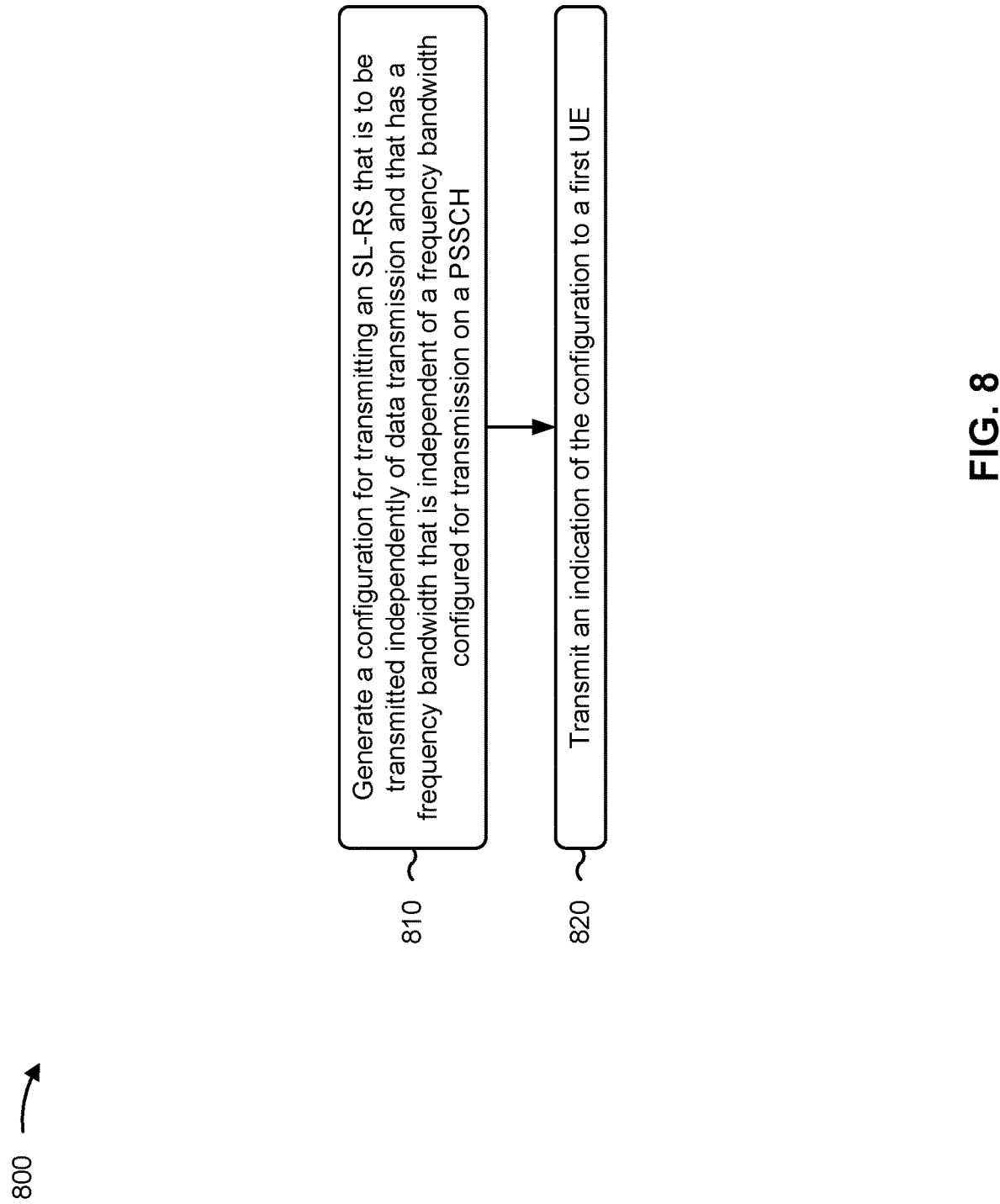
FIG. 8 is a diagram illustrating an example process performed, for example, by a second UE, in accordance with the present disclosure.

FIG. 8 is a diagram illustrating an example process 800 performed, for example, by a second UE, in accordance with the present disclosure. Example process 800 is an example where the UE (e.g., UE 120, UE 405) performs operations associated with configuring sidelink reference signals.

As shown in FIG. 8, in some aspects, process 800 may include generating a configuration for transmitting an SL-RS that is to be transmitted independently of data transmission and that has a frequency bandwidth that is independent of a frequency bandwidth configured for transmission on a PSSCH (block 810). For example, the UE (e.g., using communication manager 140 and/or configuration component 1008 depicted in FIG. 10) may generate a configuration for transmitting an SL-RS that is to be transmitted independently of data transmission and that has a frequency bandwidth that is independent of a frequency bandwidth configured for transmission on a PSSCH, as described above.

As further shown in FIG. 8, in some aspects, process 800 may include transmitting an indication of the configuration to a first UE (block 820). For example, the UE (e.g., using communication manager 140 and/or transmission component 1004 depicted in FIG. 10) may transmit an indication of the configuration to a first UE, as described above.

Process 800 may include additional aspects, such as any single aspect or any combination of aspects described below and/or in connection with one or more other processes described elsewhere herein.

In a first aspect, process 800 includes receiving the SL-RS from the first UE, and transmitting, to the first UE, a report that is based at least in part on the SL-RS.

In a second aspect, alone or in combination with the first aspect, the configuration specifies that the SL-RS is to be transmitted in one or more symbols in a sidelink slot after a PSSCH or a PSCCH in the sidelink slot.

In a third aspect, alone or in combination with one or more of the first and second aspects, the configuration specifies that the SL-RS is to be transmitted in one or more specified REs of a sidelink slot.

In a fourth aspect, alone or in combination with one or more of the first through third aspects, the configuration specifies that the SL-RS is to be transmitted in a sidelink slot that is allocated for the SL-RS.

In a fifth aspect, alone or in combination with one or more of the first through fourth aspects, wherein the configuration specifies that resources allocated for SL-RSs are not included in a resource pool configuration. Alternatively, the resources may be included in a resource pool configuration but are not available for data transmission or for transmission on a physical sidelink channel (e.g., PSCCH, PSSCH, PSFCH).

In a sixth aspect, alone or in combination with one or more of the first through fifth aspects, the transmitting the indication of the configuration includes transmitting indication of the configuration as part of a resource pool configuration.

In a seventh aspect, alone or in combination with one or more of the first through sixth aspects, the configuration specifies a bandwidth for the SL-RS.

In an eighth aspect, alone or in combination with one or more of the first through seventh aspects, the configuration specifies one or more of a quantity of one or more symbols for the SL-RS in a sidelink slot, a location of the one or more symbols for the SL-RS in the sidelink slot, a quantity of one or more gap symbols in the sidelink slot, a location of the one or more gap symbols in the sidelink slot, a quantity of one or more AGC symbols in the sidelink slot, or a location of the one or more AGC symbols in the sidelink slot.

In a ninth aspect, alone or in combination with one or more of the first through eighth aspects, the configuration specifies one or more of a comb pattern for one or more symbols for the SL-RS in a sidelink slot, a hopping pattern for the one or more symbols for the SL-RS in the sidelink slot, or a repetition factor for a symbol for the SL-RS in the sidelink slot.

In a tenth aspect, alone or in combination with one or more of the first through ninth aspects, process 800 includes receiving an index, via SCI or a MAC CE, that corresponds to the configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
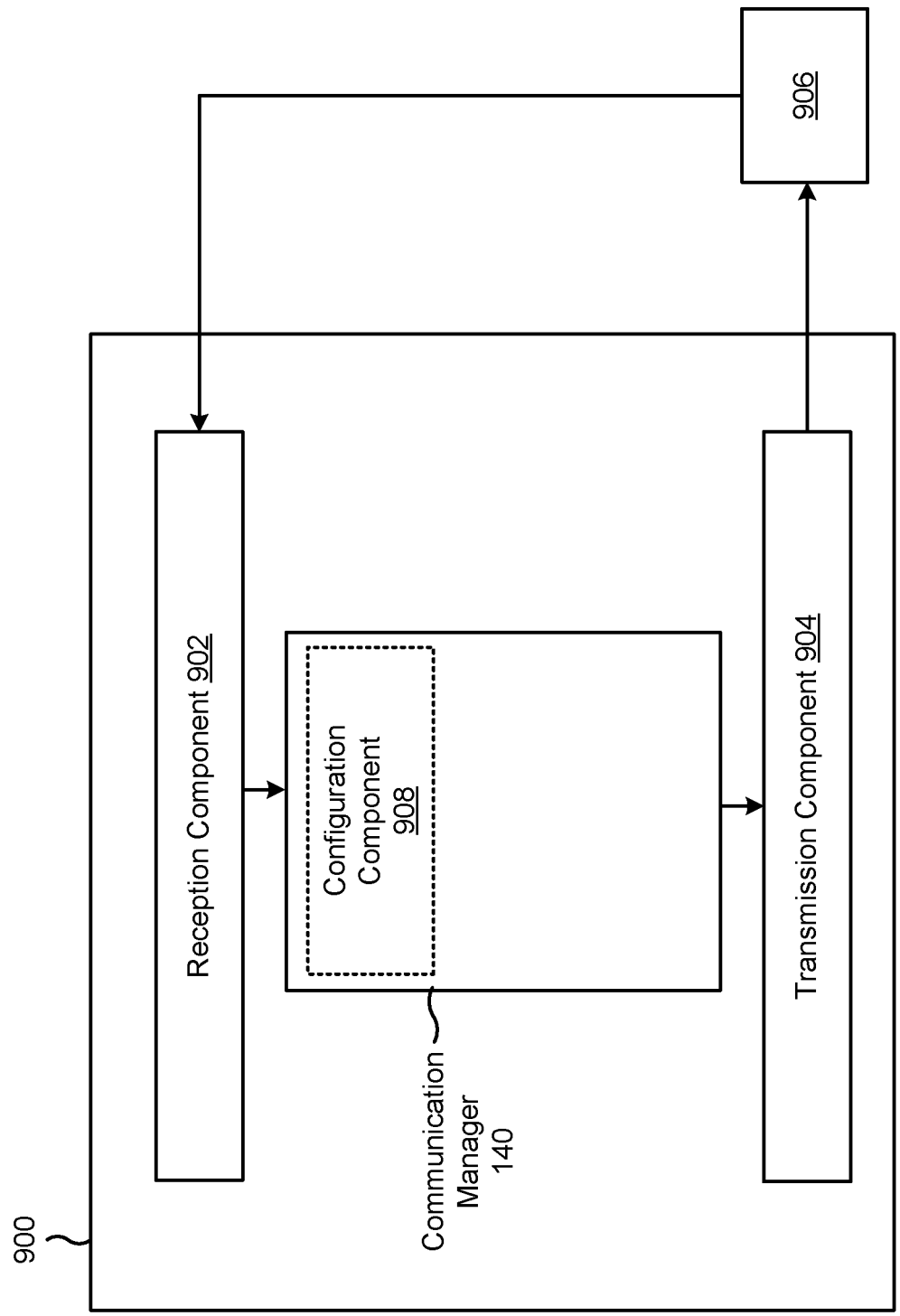
FIGS. 9-10 are diagrams of example apparatuses for wireless communication, in accordance with the present disclosure.

FIG. 9 is a diagram of an example apparatus 900 for wireless communication. The apparatus 900 may be a first UE (e.g., UE 120, UE 410), or a first UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a configuration component 908, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the first UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the first UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the first UE described in connection with FIG. 2. In some aspects, the transmission component 904 may be co-located with the reception component 902 in a transceiver.

The reception component 902 may receive an indication of a configuration for transmitting an SL-RS that is to be transmitted independently of data transmission and that has a frequency bandwidth that is independent of a frequency bandwidth configured for transmission on a PSSCH. The configuration component 908 may configure the apparatus 906 to transmit the SL-RS. The transmission component 904 may transmit the SL-RS to a second UE according to the configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
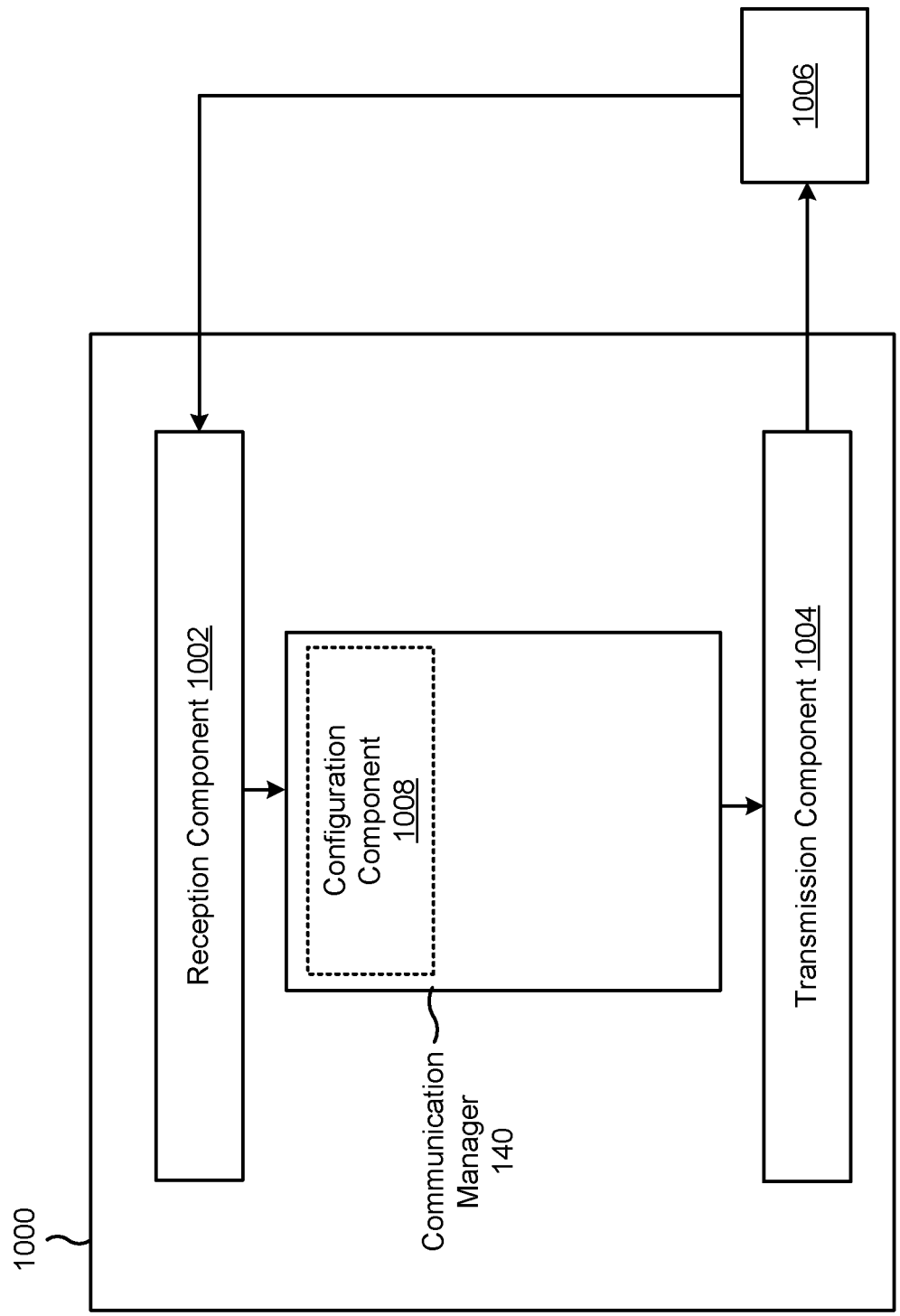

FIG. 10 is a diagram of an example apparatus 1000 for wireless communication. The apparatus 1000 (e.g., UE 120, UE 405) may be a second UE or a base station 110, or a second UE or a base station 110 may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a configuration component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the second UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the second UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the second UE described in connection with FIG. 2. In some aspects, the transmission component 1004 may be co-located with the reception component 1002 in a transceiver.

The configuration component 1008 may generate a configuration for transmitting an SL-RS that is to be transmitted independently of data transmission and that has a frequency bandwidth that is independent of a frequency bandwidth configured for transmission on a PSSCH. The transmission component 1004 may transmit an indication of the configuration to a first UE.

The reception component 1002 may receive the SL-RS from the first UE. The transmission component 1004 may transmit, to the first UE, a report that is based at least in part on the SL-RS.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first user equipment (UE), comprising: receiving an indication of a configuration for transmitting a sidelink reference signal (SL-RS) that is to be transmitted independently of data transmission and that has a frequency bandwidth that is independent of a frequency bandwidth configured for transmission on a physical sidelink shared channel (PSSCH); and transmitting the SL-RS to a second UE according to the configuration.

Aspect 2: The method of Aspect 1, wherein the configuration specifies that the SL-RS is to be transmitted in one or more symbols of a sidelink slot after a PSSCH or a physical sidelink control channel in the sidelink slot.

Aspect 3: The method of Aspect 1 or 2, wherein the configuration specifies that the SL-RS is to be transmitted in one or more specified resource elements of a sidelink slot.

Aspect 4: The method of Aspect 1, wherein the configuration specifies that the SL-RS is to be transmitted in a sidelink slot that is allocated for the SL-RS.

Aspect 5: The method of any of Aspects 1-4, wherein the configuration specifies not to use resources in a specified resource pool for the SL-RS that are unavailable for the SL-RS.

Aspect 6: The method of any of Aspects 1-5, wherein the receiving the indication of the configuration includes receiving the indication of the configuration as part of a resource pool configuration.

Aspect 7: The method of any of Aspects 1-6, wherein the configuration specifies a bandwidth for the SL-RS.

Aspect 8: The method of any of Aspects 1-7, wherein the configuration specifies one or more of: a quantity of one or more symbols for the SL-RS in a sidelink slot, a location of the one or more symbols for the SL-RS in the sidelink slot, a quantity of one or more gap symbols in the sidelink slot, a location of the one or more gap symbols in the sidelink slot, a quantity of one or more automatic gain control (AGC) symbols in the sidelink slot, or a location of the one or more AGC symbols in the sidelink slot.

Aspect 9: The method of any of Aspects 1-8, wherein the configuration specifies one or more of: a comb pattern for one or more symbols for the SL-RS in a sidelink slot, a hopping pattern for the one or more symbols for the SL-RS in the sidelink slot, or a repetition factor for a symbol for the SL-RS in the sidelink slot.

Aspect 10: The method of any of Aspects 1-9, further comprising transmitting an index, via sidelink control information or a medium access control control element (MAC CE), that corresponds to the configuration.

Aspect 11: The method of any of Aspects 1-10, wherein the transmitting the SL-RS includes, if transmission of the SL-RS is to overlap at least in a time domain with transmission of other SL or uplink transmissions, prioritizing transmission of the SL-RS based at least in part on one or more of a priority of the SL-RS relative to a priority of the other SL or uplink transmissions, a component carrier index, a content of a report for the SL-RS, a periodicity of the SL-RS, a block error rate target for the SL-RS, a triggering entity, or a cast type of the other SL or uplink resources.

Aspect 12: A method of wireless communication performed by a second user equipment (UE), comprising: generating a configuration for transmitting a sidelink reference signal (SL-RS) that is to be transmitted independently of data transmission and that has a frequency bandwidth that is independent of a frequency bandwidth configured for transmission on a physical sidelink shared channel (PSSCH); and transmitting an indication of the configuration to a first UE.

Aspect 13: The method of Aspect 12, further comprising: receiving the SL-RS from the first UE; and transmitting, to the first UE, a report that is based at least in part on the SL-RS.

Aspect 14: The method of Aspect 12 or 13, wherein the configuration specifies that the SL-RS is to be transmitted in one or more symbols in a sidelink slot after a PSSCH or a physical sidelink control channel in the sidelink slot.

Aspect 15: The method of any of Aspects 12-14, wherein the configuration specifies that the SL-RS is to be transmitted in one or more specified resource elements of a sidelink slot.

Aspect 16: The method of Aspect 12 or 13, wherein the configuration specifies that the SL-RS is to be transmitted in a sidelink slot that is allocated for the SL-RS.

Aspect 17: The method of any of Aspects 12-16, wherein the configuration specifies that resources allocated for SL-RSs are not included in a resource pool configuration or that SL-RSs included in a resource pool configuration are not available for transmission on a physical sidelink channel. For example, the resources are configured as part of a resource pool but not available for data transmission or for PSCCH/PSSCH/PSFCH transmission.

Aspect 18: The method of any of Aspects 12-17, wherein the transmitting the indication of the configuration includes transmitting indication of the configuration as part of a resource pool configuration.

Aspect 19: The method of any of Aspects 12-18, wherein the configuration specifies a bandwidth for the SL-RS.

Aspect 20: The method of any of Aspects 12-19, wherein the configuration specifies one or more of: a quantity of one or more symbols for the SL-RS in a sidelink slot, a location of the one or more symbols for the SL-RS in the sidelink slot, a quantity of one or more gap symbols in the sidelink slot, a location of the one or more gap symbols in the sidelink slot, a quantity of one or more automatic gain control (AGC) symbols in the sidelink slot, or a location of the one or more AGC symbols in the sidelink slot.

Aspect 21: The method of any of Aspects 12-20, wherein the configuration specifies one or more of: a comb pattern for one or more symbols for the SL-RS in a sidelink slot, a hopping pattern for the one or more symbols for the SL-RS in the sidelink slot, or a repetition factor for a symbol for the SL-RS in the sidelink slot.

Aspect 22: The method of any of Aspects 12-21, further comprising receiving an index, via sidelink control information or a medium access control control element (MAC CE), that corresponds to the configuration.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
    one or more memories; and
    one or more processors coupled to the one or more memories, the one or more memories including instructions executable by the one or more processors to cause the first UE to:
        receive an indication of a configuration for transmitting a sidelink reference signal (SL-RS) that is to be transmitted independently of a data transmission and that has a frequency bandwidth that is wider than a frequency bandwidth configured for transmission on a physical sidelink shared channel (PSSCH); and
        transmit the SL-RS to a second UE according to the configuration,
            wherein the one or more memories further include instructions executable by the one or more processors to cause the first UE to, if a transmission of the SL-RS is to overlap at least in a time domain with a transmission of other SL or uplink transmissions, prioritize the transmission of the SL-RS based at least in part on one or more of:
                a component carrier index, or
                a periodicity of the SL-RS.

2. The first UE of claim 1, wherein the configuration specifies that the SL-RS is to be transmitted in one or more symbols of a sidelink slot after the PSSCH or a physical sidelink control channel in the sidelink slot.

3. The first UE of claim 1, wherein the configuration specifies that the SL-RS is to be transmitted in one or more specified resource elements of a sidelink slot.

4. The first UE of claim 1, wherein the configuration specifies that the SL-RS is to be transmitted in a sidelink slot that is allocated for the SL-RS.

5. The first UE of claim 1, wherein the configuration specifies that resources allocated for SL-RSs are not included in a resource pool configuration or that SL-RSs included in the resource pool configuration are not available for transmission on a physical sidelink channel.

6. The first UE of claim 1, wherein the one or more memories further include instructions executable by the one or more processors to cause the first UE to receive the indication of the configuration as part of a resource pool configuration.

7. The first UE of claim 1, wherein the configuration specifies a bandwidth for the SL-RS.

8. The first UE of claim 1, wherein the configuration specifies one or more of:
    a quantity of one or more symbols for the SL-RS in a sidelink slot,
    a location of the one or more symbols for the SL-RS in the sidelink slot,
    a quantity of one or more gap symbols in the sidelink slot,
    a location of the one or more gap symbols in the sidelink slot,
    a quantity of one or more automatic gain control (AGC) symbols in the sidelink slot, or
    a location of the one or more AGC symbols in the sidelink slot.

9. The first UE of claim 1, wherein the configuration specifies one or more of:
    a comb pattern for one or more symbols for the SL-RS in a sidelink slot,
    a hopping pattern for the one or more symbols for the SL-RS in the sidelink slot, or
    a repetition factor for a symbol for the SL-RS in the sidelink slot.

10. The first UE of claim 1, wherein the one or more memories further include instructions executable by the one or more processors to cause the first UE to transmit an index, via sidelink control information or a medium access control control element (MAC CE), that corresponds to the configuration.

11. The first UE of claim 1, wherein the one or more memories further include instructions executable by the one or more processors to cause the first UE to, if the transmission of the SL-RS is to overlap at least in the time domain with the transmission of other SL or uplink transmissions, prioritize the transmission of the SL-RS further based at least in part on a priority of the SL-RS relative to a priority of the other SL or uplink transmissions.

12. A second user equipment (UE) for wireless communication, comprising:
one or more memories; and
one or more processors coupled to the one or more memories, the one or more memories including instructions executable by the one or more processors to cause the second UE to:
generate a configuration for transmitting a sidelink reference signal (SL-RS) that is to be transmitted independently of a data transmission and that has a frequency bandwidth that is wider than a frequency bandwidth configured for transmission on a physical sidelink shared channel (PSSCH),
wherein the configuration specifies one or more of:
a quantity of one or more gap symbols in a sidelink slot, or
a quantity of one or more automatic gain control (AGC) symbols in the sidelink slot; and
transmit an indication of the configuration to a first UE.

13. The second UE of claim 12, wherein the one or more memories further include instructions executable by the one or more processors to cause the UE to:
receive the SL-RS from the first UE; and
transmit, to the first UE, a report that is based at least in part on the SL-RS.

14. The second UE of claim 12, wherein the configuration specifies that the SL-RS is to be transmitted in one or more symbols in a sidelink slot after the PSSCH or a physical sidelink control channel in the sidelink slot.

15. The second UE of claim 12, wherein the configuration specifies that the SL-RS is to be transmitted in one or more specified resource elements of a sidelink slot.

16. The second UE of claim 12, wherein the configuration specifies that the SL-RS is to be transmitted in a sidelink slot that is allocated for the SL-RS.

17. The second UE of claim 12, wherein the configuration specifies that resources allocated for SL-RSs are not included in a resource pool configuration or that SL-RSs included in the resource pool configuration are not available for transmission on a physical sidelink channel.

18. The second UE of claim 12, wherein the one or more memories further include instructions executable by the one or more processors to cause the second UE to transmit the indication of the configuration as part of a resource pool configuration.

19. The second UE of claim 12, wherein the configuration specifies a bandwidth for the SL-RS.

20. The second UE of claim 12, wherein the configuration further specifies one or more of:
a location of the one or more gap symbols in the sidelink slot,
a location of the one or more AGC symbols in the sidelink slot,
a location of one or more symbols for the SL-RS in the sidelink slot, or
a quantity of the one or more symbols for the SL-RS in a sidelink slot.

21. The second UE of claim 12, wherein the configuration further specifies one or more of:
a comb pattern for one or more symbols for the SL-RS in a sidelink slot,
a hopping pattern for the one or more symbols for the SL-RS in the sidelink slot, or
a repetition factor for a symbol for the SL-RS in the sidelink slot.

22. The second UE of claim 12, wherein the one or more memories further include instructions executable by the one or more processors to cause the second UE to receive an index, via sidelink control information or a medium access control control element (MAC CE), that corresponds to the configuration.

23. A method of wireless communication performed by a first user equipment (UE), comprising:
receiving an indication of a configuration for transmitting a sidelink reference signal (SL-RS) that is to be transmitted independently of a data transmission and that has a frequency bandwidth that is wider than a frequency bandwidth configured for transmission on a physical sidelink shared channel (PSSCH); and
transmitting the SL-RS to a second UE according to the configuration,
wherein, if a transmission of the SL-RS is to overlap at least in a time domain with a transmission of other SL or uplink transmissions, transmitting the SL-RS to the second UE according to the configuration includes prioritizing the transmission of the SL-RS based at least in part on one or more of:
a component carrier index, or
a periodicity of the SL-RS.

24. The method of claim 23, wherein the configuration specifies that the SL-RS is to be transmitted in one or more symbols of a sidelink slot after the PSSCH or a physical sidelink control channel in the sidelink slot.

25. The method of claim 23, wherein the configuration specifies that the SL-RS is to be transmitted in one or more specified resource elements of a sidelink slot.

26. The method of claim 23, wherein the configuration specifies that the SL-RS is to be transmitted in a sidelink slot that is allocated for the SL-RS.

27. A method of wireless communication performed by a second user equipment (UE), comprising:
generating a configuration for transmitting a sidelink reference signal (SL-RS) that is to be transmitted independently of a data transmission and that has a frequency bandwidth that is wider than a frequency bandwidth configured for transmission on a physical sidelink shared channel (PSSCH),
wherein the configuration specifies one or more of:
a quantity of one or more gap symbols in a sidelink slot, or
a quantity of one or more automatic gain control (AGC) symbols in the sidelink slot; and
transmitting an indication of the configuration to a first UE.

28. The method of claim 27, wherein the configuration further specifies that the SL-RS is to be transmitted in one or more symbols in a sidelink slot after the PSSCH or a physical sidelink control channel in the sidelink slot.

29. The method of claim 27, wherein the configuration further specifies that the SL-RS is to be transmitted in one or more specified resource elements of a sidelink slot.

30. The method of claim 27, wherein the configuration further specifies that the SL-RS is to be transmitted in a sidelink slot that is allocated for the SL-RS.

* * * * *